United States Patent
Nakanishi et al.

(10) Patent No.: US 10,923,780 B2
(45) Date of Patent: Feb. 16, 2021

(54) HIGH PRESSURE TYPE HYDRIDE SECONDARY BATTERY

(71) Applicants: TOYOTA JIDOSHA KABUSHIKI KAISHA, Toyota (JP); HIROSHIMA UNIVERSITY, Higashi-Hiroshima (JP)

(72) Inventors: Haruyuki Nakanishi, Nagoya (JP); Yoshitsugu Kojima, Higashihiroshima (JP); Takayuki Ichikawa, Higashihiroshima (JP); Hiroki Miyaoka, Higashihiroshima (JP)

(73) Assignees: TOYOTA JIDOSHA KABUSHIKI KAISHA, Toyota (JP); HIROSHIMA UNIVERSITY, Higashi-Hiroshima (JP)

(*) Notice: Subject to any disclaimer, the term of this patent is extended or adjusted under 35 U.S.C. 154(b) by 126 days.

(21) Appl. No.: 15/703,121

(22) Filed: Sep. 13, 2017

(65) Prior Publication Data

US 2018/0083324 A1 Mar. 22, 2018

(30) Foreign Application Priority Data

Sep. 16, 2016 (JP) .............................. JP2016-181602

(51) Int. Cl.
*H01M 10/34* (2006.01)
*H01M 4/38* (2006.01)
(Continued)

(52) U.S. Cl.
CPC .............. *H01M 10/52* (2013.01); *B22F 9/04* (2013.01); *C22C 1/0433* (2013.01);
(Continued)

(58) Field of Classification Search
CPC ........ H01M 10/52; H01M 4/52; H01M 4/242; H01M 10/345; H01M 4/32; H01M 4/385;
(Continued)

(56) References Cited

U.S. PATENT DOCUMENTS 4,216,274 A * 8/1980 Bruning ................ C01B 3/0031
429/57
4,378,331 A * 3/1983 Bruning ................ C01B 3/0031
420/455
(Continued)

FOREIGN PATENT DOCUMENTS

| WO | 02/21626 A1 | 3/2002 |
| WO | 2009/037806 A1 | 3/2009 |
| WO | 2015118892 A1 | 8/2015 |

OTHER PUBLICATIONS

Dixit et al., Zinc-substitute alpha-nickel hydroxide as electrode material for alkaline secondary cells, 79-82, Journal of the Electrochemical Society, 146 (1999) (Year: 1999).*

(Continued)

*Primary Examiner* — Milton I Cano
*Assistant Examiner* — Christian Roldan
(74) *Attorney, Agent, or Firm* — Sughrue Mion, PLLC (57) ABSTRACT

A hydride secondary battery includes: a pressure vessel; a positive electrode disposed in the pressure vessel; a negative electrode disposed in the pressure vessel; and hydrogen gas with which the pressure vessel is filled. The negative electrode contains a hydrogen-absorbing alloy. In a pressure-composition-temperature diagram, a desorption curve at 25° C. of the hydrogen-absorbing alloy has a plateau pressure of 0.15 MPa or more and 10 MPa or less. The hydrogen gas has a pressure equal to or higher than the plateau pressure at 25° C. of the hydrogen-absorbing alloy.

7 Claims, 3 Drawing Sheets

(51) Int. Cl.
  *H01M 4/24* (2006.01)
  *C22C 19/00* (2006.01)
  *H01M 4/02* (2006.01)
  *C01B 3/00* (2006.01)
  *H01M 10/52* (2006.01)
  *H01M 4/32* (2006.01)
  *C22C 1/04* (2006.01)
  *B22F 9/04* (2006.01)
  *C22C 19/05* (2006.01)
  *C22C 19/03* (2006.01)
  *H01M 4/52* (2010.01)

(52) U.S. Cl.
  CPC ............ *C22C 19/007* (2013.01); *C22C 19/03* (2013.01); *C22C 19/05* (2013.01); *H01M 4/242* (2013.01); *H01M 4/32* (2013.01); *H01M 4/385* (2013.01); *H01M 4/52* (2013.01); *H01M 10/345* (2013.01); *B22F 2998/10* (2013.01); *C22C 2202/04* (2013.01); *H01M 2004/021* (2013.01); *H01M 2004/027* (2013.01); *H01M 2004/028* (2013.01); *Y02E 60/32* (2013.01)

(58) Field of Classification Search
  CPC ..... H01M 2004/028; H01M 2004/027; H01M 2004/021; Y02E 60/324; C22C 2202/04

USPC ......................................................... 429/50
  See application file for complete search history.

(56) References Cited

U.S. PATENT DOCUMENTS

| | | | | |
|---|---|---|---|---|
| 4,636,445 | A | * | 1/1987 | Yamano ............... H01M 2/0272 429/101 |
| 4,946,646 | A | * | 8/1990 | Gamo .................... C01B 3/0031 420/415 |
| 5,354,576 | A | * | 10/1994 | Zhang ................... H01M 4/383 420/455 |
| 2010/0009259 | A1 | | 1/2010 | Ohyama et al. |
| 2016/0351907 | A1 | | 12/2016 | Tsutsumi |

OTHER PUBLICATIONS

John J. Smithrick et al.: "Nickel Hydrogen Batteries—An Overview", The 1991 NASA Aerospace Battery 1991.

M.V. Lototskyy et al., "Metal hydride hydrogen compressors: A review", International Journal of Hydrogen Energy, vol. 39, No. 11, Feb. 26, 2014, pp. 5818-5851, XP028832525.

* cited by examiner

HIGH PRESSURE TYPE HYDRIDE SECONDARY BATTERY

INCORPORATION BY REFERENCE

The disclosure of Japanese Patent Application No. 2016-181602 filed on Sep. 16, 2016 including the specification, drawings and abstract is incorporated herein by reference in its entirety.

BACKGROUND

1. Technical Field

This disclosure relates to a hydride secondary battery.

2. Description of Related Art

WO2009/037806 discloses an $AB_5$ type hydrogen-absorbing alloy.

SUMMARY

A nickel-metal hydride secondary battery (Ni-MH) in which a hydrogen-absorbing alloy is used as a negative electrode active material and nickel oxyhydroxide is used as a positive electrode active material has been put to practical use. The nickel-metal hydride secondary battery has been widely used as a power source for consumer electronics. Moreover, in recent years, the nickel-metal hydride secondary battery has also been used as a power source for electric vehicles such as hybrid vehicles (HV).

For power applications in mobile bodies including power sources for electric vehicles, the mass capacity density (capacity per unit mass) of a secondary battery is important. With the expansion of power applications, a further increase in the mass capacity density of the secondary battery is preferable.

Therefore, this disclosure provides a secondary battery having a high mass capacity density.

[1] A hydride secondary battery of this disclosure includes: a pressure vessel; a positive electrode disposed in the pressure vessel; a negative electrode disposed in the pressure vessel; and hydrogen gas with which the pressure vessel is filled. The negative electrode contains a hydrogen-absorbing alloy. In a pressure-composition-temperature diagram, a desorption curve at 25° C. of the hydrogen-absorbing alloy has a plateau pressure of 0.15 MPa or more and 10 MPa or less. The hydrogen gas has a pressure equal to or higher than the plateau pressure at 25° C. of the hydrogen-absorbing alloy.

Figure 1:
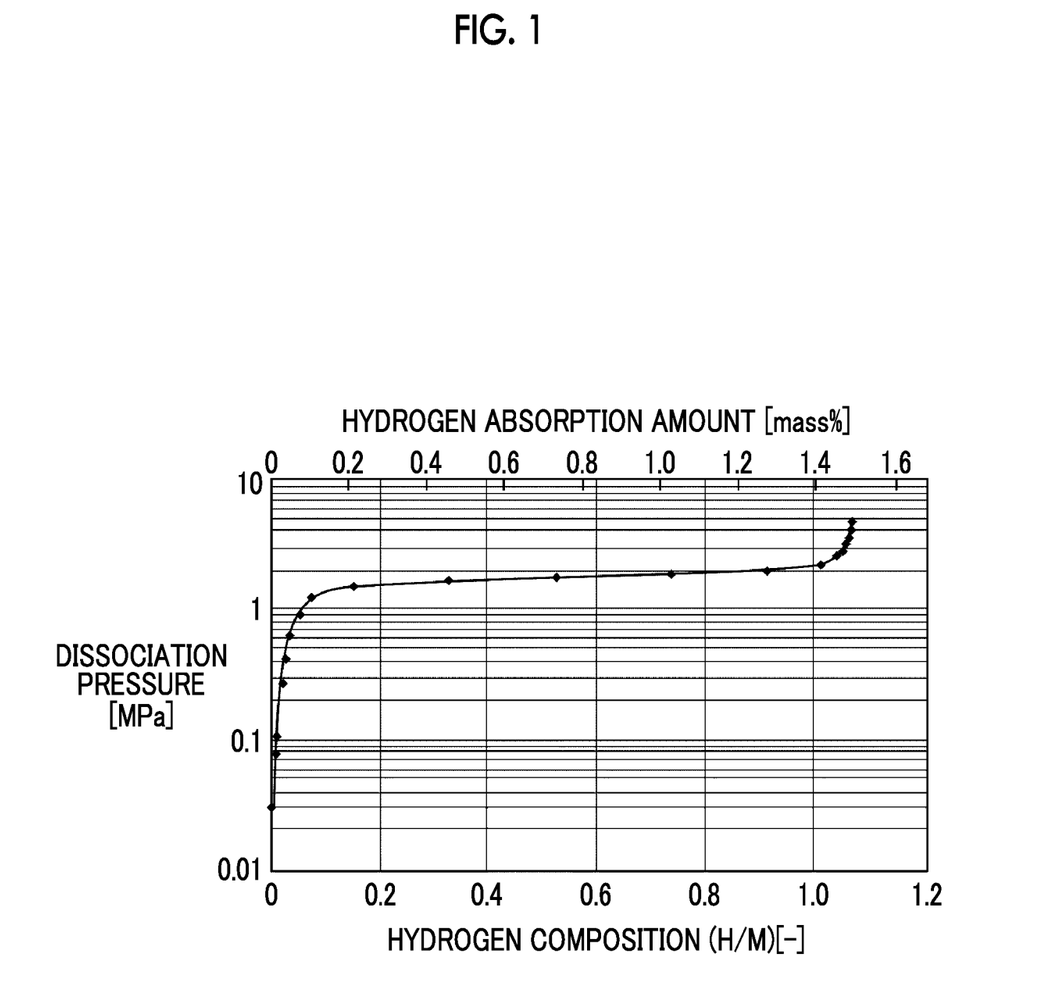
FIG. 1 is an example of the PCT diagram of a hydrogen-absorbing alloy.

The pressure-composition-temperature diagram (hereinafter, referred to as "PCT diagram") shows the basic characteristics of the hydrogen-absorbing alloy. FIG. 1 is an example of the PCT diagram of the hydrogen-absorbing alloy. FIG. 1 shows a desorption curve at 25° C.

The desorption curve is a curve created by plotting the pressure when the hydrogen-absorbing alloy releases hydrogen with respect to the hydrogen composition of the hydrogen-absorbing alloy (the ratio of the number of hydrogen atoms to the number of metal atoms (H/M)). The pressure at which the hydrogen-absorbing alloy releases hydrogen is referred to as "dissociation pressure". The region where the desorption curve is linear is referred to as "plateau region". The dissociation pressure in the plateau region is referred to as the "plateau pressure".

In the plateau region, the pressure change with the release of hydrogen is small. Therefore, in the plateau region, the hydrogen-absorbing alloy can reversibly release hydrogen even under an environment where the pressure change is small (for example, in a sealed battery). In the nickel-metal hydride secondary battery, the absorption and release of hydrogen in the hydrogen-absorbing alloy corresponds to charging and discharging of the negative electrode.

Figure 2:
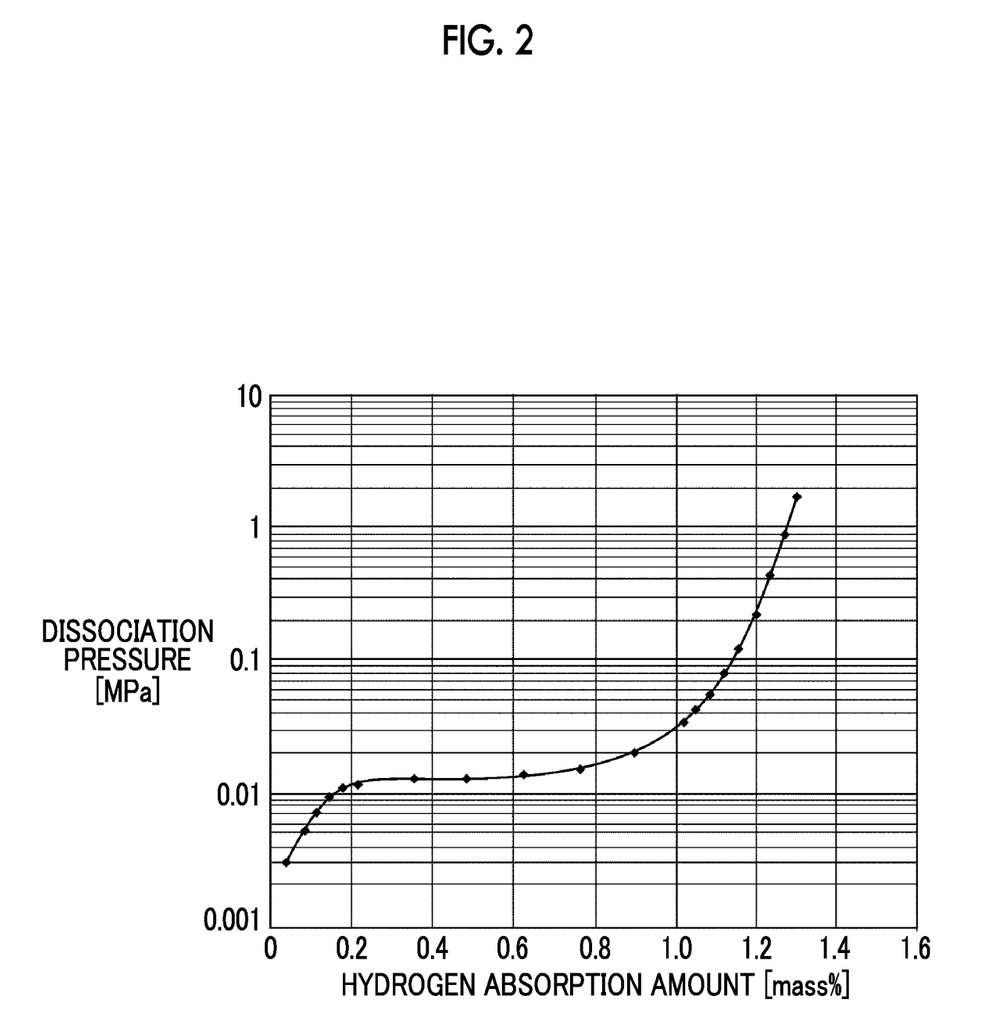
FIG. 2 is the PCT diagram of the hydrogen-absorbing alloy in the related art.

FIG. 2 is the PCT diagram of the hydrogen-absorbing alloy in the related art. In a nickel-metal hydride secondary battery in the related art, as shown in FIG. 2, a hydrogen-absorbing alloy having a plateau pressure equal to or lower than the atmospheric pressure (=0.1 MPa) at 25° C. is used. Hereinafter, such a hydrogen-absorbing alloy is referred to as a "low pressure type hydrogen-absorbing alloy".

Typically, the internal pressure of a sealed battery can be considered as the atmospheric pressure. When the plateau pressure of the hydrogen-absorbing alloy is higher than the atmospheric pressure, spontaneous release of hydrogen easily occurs in the battery. That is, self-discharge of the battery is likely to occur. In addition, since the internal pressure of the battery rises due to the release of hydrogen, it may become difficult to seal the battery. Therefore, a "high pressure type hydrogen-absorbing alloy" having a very high plateau pressure as shown in FIG. 1 has not attracted attention until now.

In the hydride secondary battery of this disclosure, a hydrogen-absorbing alloy having a plateau pressure at 25° C. of 0.15 MPa or more and 10 MPa or less is used. In the low pressure type hydrogen-absorbing alloy, the reversible hydrogen absorption amount is about 1.0 mass % to 1.1 mass %. Contrary to this, the hydrogen-absorbing alloy used in this disclosure may have, for example, a hydrogen absorption amount of 1.3 mass % or more. That is, the hydrogen-absorbing alloy can become a negative electrode active material having a higher capacity than that of the low pressure type hydrogen-absorbing alloy.

However, the hydrogen-absorbing alloy does not function as a high capacity negative electrode active material at around atmospheric pressure. That is, at around atmospheric pressure, the hydrogen-absorbing alloy cannot be fully charged. Therefore, the hydride secondary battery of this disclosure includes the pressure vessel and hydrogen gas ($H_2$). Hydrogen gas has a pressure equal to or higher than the plateau pressure of the hydrogen-absorbing alloy. Accordingly, in the hydride secondary battery of this disclosure, the hydrogen-absorbing alloy can function as a high capacity negative electrode active material. Accordingly, the mass capacity density of the battery is improved.

Here, the equilibrium negative electrode potential (discharge potential) of the hydride secondary battery of this disclosure is estimated by substituting the plateau pressure of the hydrogen-absorbing alloy into the Nernst equation. The equilibrium negative electrode potential is calculated by the following equation.

$$E = -0.93 - 0.03 \log PH_2$$

(in the equation, E represents the equilibrium negative electrode potential, and $PH_2$ represents the plateau pressure.)

From this equation, it is thought that the equilibrium negative electrode potential decreases as the plateau pressure increases. That is, it is thought that the operating voltage of the battery increases. Therefore, in the hydride secondary battery of this disclosure, the improvement in the mass energy density (energy per unit mass) can also be expected. Here, "energy" represents the product of the average operating voltage of the battery and the battery capacity.

Furthermore, in the hydride secondary battery of this disclosure, the hydrogen-absorbing alloy itself not only functions as a negative electrode active material but also as a catalyst for allowing hydrogen gas to become the second negative electrode active material. Accordingly, in the hydride secondary battery of this disclosure, two negative electrode reactions expressed by the following reaction equations proceed during discharge. At the time of charging, the reverse reaction proceeds.

$$MH+OH^-\rightarrow M+H_2O+e^- \quad \text{Hydrogen-absorbing alloy:}$$

$$\tfrac{1}{2}H_2+OH^-\rightarrow e^-+H_2O \quad \text{Hydrogen gas:}$$

(in the equations, M represents the hydrogen-absorbing alloy and MH represents a hydride of the hydrogen-absorbing alloy.)

That is, the hydride secondary battery of this disclosure includes a hybrid negative electrode including a solid negative electrode active material (hydrogen-absorbing alloy) and a gaseous negative electrode active material (hydrogen gas). The gaseous negative electrode active material is lighter than the solid negative electrode active material. Therefore, the mass capacity density of the battery is further improved by the hybrid negative electrode. As described above, the hydride secondary battery of this disclosure has a high mass capacity density.

[2] The desorption curve at 25° C. of the hydrogen-absorbing alloy may have a plateau pressure of 0.15 MPa or more and 5 MPa or less.

[3] The desorption curve at 25° C. of the hydrogen-absorbing alloy may have a plateau pressure of 0.3 MPa or more and 2.3 MPa or less.

[4] the hydrogen-absorbing alloy may be at least one selected from the group consisting of an $AB_5$ type alloy expressed by $MmNi_{5-x1}B_{x1}$, provided that Mm represents a mischmetal, B represents at least one selected from the group consisting of Fe, Cr, Mn, and Al, and x1 is 0 or more and 0.6 or less, an $AB_5$ type alloy expressed by $MmNi_{5-x2}Co_{x2}$, provided that Mm represents a mischmetal and x2 is more than 0 and 1.0 or less, and $LaNi_5$.

In the above $AB_5$ type alloys, A-site is Mm or lanthanum (La). In a case where the A-site is La, B-site is occupied by nickel (Ni). In a case where the A-site is Mm, the B-site may be occupied by Ni or a portion of Ni may be replaced with iron (Fe), chromium (Cr), manganese (Mn), aluminum (Al), or cobalt (Co). In such an $AB_5$ type alloy, the plateau pressure is 0.15 MPa or more and 10 MPa or less, and the hydrogen absorption amount tends to be large. That is, since the hydrogen-absorbing alloy is the $AB_5$ type alloy, further improvement in the mass capacity density is expected.

[5] The hydrogen-absorbing alloy may be at least one selected from the group consisting of an $AB_5$ type alloy expressed by $MmNi_{5-x3}Fe_{x3}$, provided that Mm represents a mischmetal and x3 is 0.2 or more and 0.4 or less, an $AB_5$ type alloy expressed by $MmNi_{5-x4}Cr_{x4}$, provided that Mm represents a mischmetal and x4 is 0.4 or more and 0.6 or less, an $AB_5$ type alloy expressed by $MmNi_{5-x5}Co_{x5}$, provided that Mm represents a mischmetal and x5 is 0.7 or more and 0.9 or less, an $AB_5$ type alloy expressed by $MmNi_{5-x6}Mn_{x6}$, provided that Mm represents a mischmetal and x6 is 0.4 or more and 0.6 or less, an $AB_5$ type alloy expressed by $MmNi_{5-x7}Al_{x7}$, provided that Mm represents a mischmetal and x7 is 0.4 or more and 0.6 or less, and an $AB_5$ type alloy expressed by $MmNi_{5-x8-y8}Cr_{x8}Mn_{y8}$, provided that Mm represents a mischmetal, x8 is 0.25 or more and 0.45 or less, y8 is 0.05 or more and 0.25 or less, and the sum of x8 and y8 is 0.5.

[6] The hydrogen-absorbing alloy may be at least one selected from the group consisting of $MmNi_5$, $MmNi_{4.7}Fe_{0.3}$, $MmNi_{4.5}Cr_{0.5}$, $MmNi_{4.2}Co_{0.8}$, $MmNi_{4.5}Mn_{0.5}$, $MmNi_{4.5}Al_{0.5}$, $MmNi_{4.5}Cr_{0.45}Mn_{0.05}$, and $MmNi_{4.5}Cr_{0.25}Mn_{0.25}$, provided that Mm represents a mischmetal.

[7] The $AB_5$ type alloy according to [2] may have a hydrogen absorption amount of 1.3 mass % or more and 1.5 mass % or less.

[8] The hydrogen gas may have a pressure at 25° C. of 10 MPa or more and 70 MPa or less.

Since the hydrogen-absorbing alloy functions as a high capacity negative electrode active material, the hydrogen gas may have a pressure equal to or higher than the plateau pressure of the hydrogen-absorbing alloy. Here, the pressure of hydrogen gas may be high as long as the sealing of hydrogen gas is possible. This is because as the hydrogen gas serving as the gaseous negative electrode active material is compressed at a high pressure, the improvement in the volumetric energy density (energy per unit volume) of the battery is expected. For example, in a case where the hydrogen gas has a pressure of 20 MPa at 25° C., the hydride secondary battery of this disclosure is estimated to exhibit a mass energy density of 180 Wh/kg and a volumetric energy density of 500 Wh/l. In addition, as a high pressure hydrogen tank for fuel cells, 70 MPa pressure vessels have also been developed.

[9] The positive electrode may contain at least one of nickel oxyhydroxide and nickel hydroxide. That is, the positive electrode may be a nickel positive electrode. In a case where the positive electrode is the nickel positive electrode, in the hydride secondary battery, the reactions expressed by the following reaction equations proceed during discharging (the reverse reactions proceed during charging).

$$(+)NiOOH+H_2O+e^-\rightarrow Ni(OH)_2+OH^-$$

$$(-)MH+OH^-\rightarrow M+H_2O+e^-$$

$$(-)\tfrac{1}{2}H_2+OH^-\rightarrow e^-+H_2O$$

(in the equations, (+) represents a positive electrode reaction, and (−) represents a negative electrode reaction.)

As shown in the above reaction equations, in the nickel positive electrode in a charged state, the positive electrode active material is nickel oxyhydroxide (NiOOH), and in the nickel positive electrode in a discharged state, the positive electrode active material is nickel hydroxide (Ni(OH)$_2$). Therefore, at any state of charge, the nickel positive electrode contains at least one of nickel oxyhydroxide and nickel hydroxide.

As described above, in the hydride secondary battery of this disclosure, the improvement in the operating voltage can be expected according to the plateau pressure of the hydrogen-absorbing alloy. In a case where the hydride secondary battery of this disclosure includes a nickel positive electrode, an operating voltage higher than that of the nickel-metal hydride secondary battery in the related art by about 0.01 V to 0.04 V can be expected.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment of this disclosure (hereinafter, referred to as "this embodiment") will be described. However, the following description does not limit the scope of this disclosure.

High Pressure Type Hydride Secondary battery

A high pressure type hydride secondary battery of this embodiment has a high mass capacity density. Therefore, the high pressure type hydride secondary battery of this embodiment is suitable as a power source for, for example, HV and electric vehicles (EV). However, the application of the high pressure type hydride secondary battery of this embodiment is not limited to such applications for vehicles. The high pressure type hydride secondary battery of this embodiment can be applied to any applications.

Figure 3:
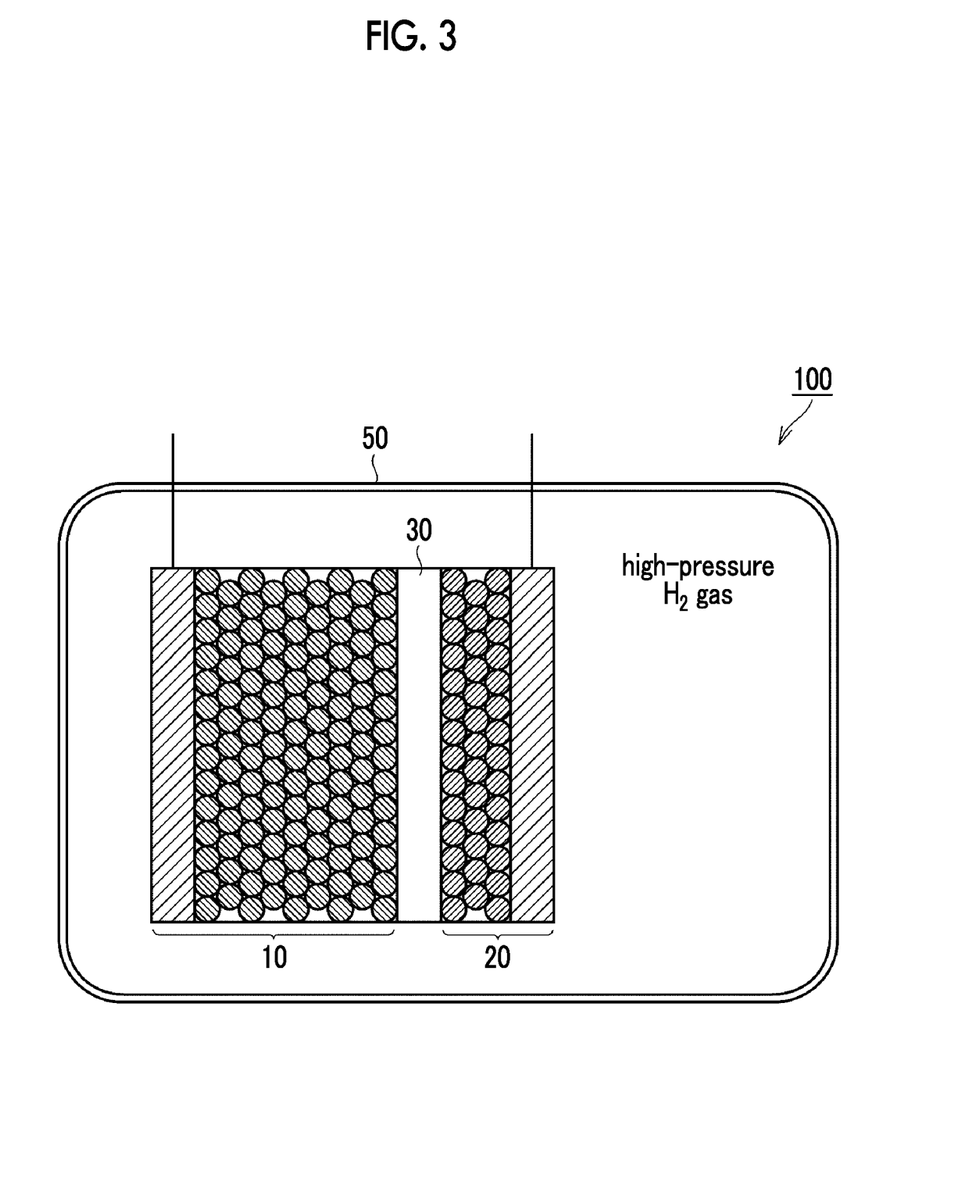
FIG. 3 is a conceptual diagram illustrating a high pressure type hydride secondary battery according to an embodiment of this disclosure.

Hereinafter, the high pressure type hydride secondary battery is abbreviated as "battery" in some cases. FIG. 3 is a conceptual diagram illustrating the high pressure type hydride secondary battery according to this embodiment. A battery 100 includes a pressure vessel 50. In the pressure vessel 50, a positive electrode 10 and a negative electrode 20 are disposed. The positive electrode 10 and the negative electrode 20 are led out to the outside by lead wires. A separator 30 is disposed between the positive electrode 10 and the negative electrode 20. Although not illustrated, the positive electrode 10, the negative electrode 20, and the separator 30 are impregnated with an electrolyte. High pressure hydrogen gas is sealed in the space inside the pressure vessel 50.

That is, the battery 100 includes the pressure vessel 50, the positive electrode 10 disposed in the pressure vessel 50, the negative electrode 20 disposed in the pressure vessel 50, and the hydrogen gas with which the pressure vessel 50 is filled. The positive electrode 10 and the negative electrode 20 may be wound with the separator 30 interposed therebetween. The battery 100 may include a plurality of the positive electrodes 10 and a plurality of the negative electrodes 20. For example, the positive electrodes 10 and the negative electrodes 20 may be alternately laminated with the separator 30 interposed therebetween.

Pressure Vessel

The structure of the pressure vessel 50 is not particularly limited as long as the pressure vessel 50 can withstand the pressure of the hydrogen gas. For example, the wall of the pressure vessel 50 may have a multilayer structure. The multilayer structure may include a carbon fiber reinforced plastic (CFRP) layer. The CFRP layer is expected to have pressure resistance. The multilayer structure may include at least one of a metal liner and a resin liner. The metal liner and the resin liner are expected to have an action of sealing the hydrogen gas. It is desirable that the metal liner is made of a material that is less likely to be affected by hydrogen gas. The metal liner is made of, for example, an Al alloy (Alloy 6061 or the like), or stainless steel (SUS316L or the like). The resin liner is made of, for example, polyamide (PA).

Negative Electrode

The negative electrode 20 contains a hydrogen-absorbing alloy. The shape of the negative electrode 20 is not particularly limited. The negative electrode 20 may be, for example, a plate-like member. The planar shape of the negative electrode 20 may be a rectangular shape, a band shape, or the like. The negative electrode 20 may be, for example, a molded body of the hydrogen-absorbing alloy. The negative electrode 20 may be formed, for example, by coating a current collector with a negative electrode mixture material containing a powder-like hydrogen-absorbing alloy, a conductive material, and a binder. That is, the negative electrode 20 may contain a conductive material, a binder, a current collector, and the like as long as a hydrogen-absorbing alloy is contained therein.

The conductive material may be metal powder such as copper (Cu) and Ni, carbon fiber, carbon powder such as carbon black, or the like. The binder may be, for example, polyvinyl alcohol (PVA), carboxymethyl cellulose (CMC), polyethylene (PE), styrene butadiene rubber (SBR), polytetrafluoroethylene (PTFE), or a copolymer of tetrafluoroethylene and hexafluoropropylene (FEP). The current collector may be, for example, punched metal, expanded metal, or foamed metal. The material of the current collector may be, for example, Ni or Fe plated with Ni. The negative electrode mixture material may contain, for example, 70 mass % to 98 mass % of the hydrogen-absorbing alloy, 1 mass % to 20 mass % of the conductive material, and 1 mass % to 10 mass % of the binder.

High Pressure Type Hydrogen-Absorbing Alloy

In this embodiment, the negative electrode 20 contains a high pressure type hydrogen-absorbing alloy. That is, in a PCT diagram, a desorption curve at 25° C. of the hydrogen-absorbing alloy has a plateau pressure of 0.15 MPa or more and 10 MPa or less. The plateau pressure varies depending on the alloy composition of the hydrogen-absorbing alloy. As the plateau pressure increases, the improvement in the operating voltage of the battery can be expected. The plateau pressure may be, for example, 0.15 MPa or more and 5 MPa or less, 0.15 MPa or more and 2.3 MPa or less, 0.2 MPa or more and 2.3 MPa or less, or 0.3 MPa or more and 2.3 MPa or less, 0.57 MPa or more and 2.3 MPa or less, or 1.6 MPa or more and 2.3 MPa or less.

The "desorption curve at 25° C." in this specification is measured by the method based on "JIS H 7201". In the measurement, a known Sieverts' instrument is used. During the measurement, when a thermometer disposed in a sample chamber (thermostat) indicates a temperature of 24° C. to 26° C., it is assumed that the desorption curve at 25° C. is measured.

As illustrated in FIG. 1, in the PCT diagram, the vertical axis represents the dissociation pressure and the horizontal axis represents the hydrogen composition (H/M). The vertical axis has a common logarithmic scale. As described above, the hydrogen composition (H/M) represents the ratio (dimensionless number) of the number of hydrogen atoms to the number of metal atoms. The desorption curve at 25° C. may be created by connecting at least 10 measurement points, and preferably 20 measurement points.

The "plateau pressure" in this specification is calculated as follows. First, a straight line passing through three consecutive points in the desorption curve is drawn. The slope of the straight line is obtained. In a case where the three points do not lie on one straight line, the slope of the straight line is obtained by the least squares method. The combination of three points with the smallest slope is determined. The arithmetic average value of the dissociation pressures of the three points is regarded as the "plateau pressure".

Typically, in a case where the desorption curve is measured, an absorption curve is also measured. The absorption curve is a curve created by plotting the pressure (absorption pressure) when the hydrogen-absorbing alloy absorbs hydrogen against the hydrogen composition. In general, the absorption curve shifts to the higher pressure side than the desorption curve. Therefore, the fact that the desorption curve at 25° C. has a plateau pressure of 0.15 MPa or more means that both the desorption curve and the absorption curve at 25° C. have a plateau pressure of 0.15 MPa or more.

Desorption curves and plateau pressures at other than 25° C. may also be measured. From the plateau pressure at 25° C. and the plateau pressures at the other temperatures, the standard enthalpy change and the standard entropy change when the hydrogen-absorbing alloy releases hydrogen are obtained. It is thought that the plateau pressure, the standard enthalpy change, and the standard entropy change satisfy the following relational equation.

$$\ln PH_2 = \Delta H/RT - \Delta S/R$$

(in the equation, $PH_2$ represents the plateau pressure, $\Delta H$ represents the standard enthalpy change, $\Delta S$ represents the standard entropy change, R represents the gas constant, and T represents the temperature at which the desorption curve is measured.) Therefore, since the natural logarithm of the plateau pressure ($PH_2$) is plotted against the reciprocal of the temperature (1/T), $\Delta H$ is obtained from the slope of the straight line, and $\Delta S$ is obtained from the intercept of the straight line.

Alloy Composition

As the hydrogen-absorbing alloy, an AB type alloy (an alloy having a CsCl type crystal structure), an $A_2B$ type alloy (an alloy having a $Mg_2Ni$ type crystal structure), an $AB_5$ type alloy (an alloy having a $CaCu_5$ type crystal structure), and the like are known. Among them, the $AB_5$ type alloy can become the high pressure type hydrogen-absorbing alloy. Furthermore, the $AB_5$ type alloys expressed by Formulas (1) and (2) and $LaNi_5$ are high pressure type hydrogen-absorbing alloys and tend to have a large hydrogen absorption amount.

$$MmNi_{5-x1}B_{x1} \quad (1)$$

(in the formula, Mm represents the mischmetal, B represents at least one selected from the group consisting of Fe, Cr, Mn, and Al, and x1 is 0 or more and 0.6 or less.)

$$MmNi_{5-x2}Co_{x2} \quad (2)$$

(in the formula, Mm represents the mischmetal, and x2 is more than 0 and 1.0 or less.)

The negative electrode 20 may contain one kind of hydrogen-absorbing alloy singly or may contain two or more kinds of hydrogen-absorbing alloy. Therefore, the hydrogen-absorbing alloy is at least one selected from the group consisting of (i) the $AB_5$ type alloy expressed by Formula (1), (ii) the $AB_5$ type alloy represented by Formula (2), and (iii) $LaNi_5$.

The "mischmetal (Mm)" represents a mixture of rare earth elements primarily containing cerium (Ce) and La. "Primarily containing Ce and La" means that the sum of Ce and La occupies 50 mass % or more of the entire mixture. In addition to Ce and La, Mm may contain neodymium (Nd), praseodymium (Pr), samarium (Sm), magnesium (Mg), Al, Fe, and the like. Mm contains, for example, 40 mass % to 60 mass % of Ce, 10 mass % to 35 mass % of La, and Nd, Pr, Sm, and the like as the remainder. Specific examples include Mm containing 53.7 mass % of Ce, 24.1 mass % of La, 16.5 mass % of Nd, and 5.8 mass % of Pr. Mm with a high content of La (so-called "lanthanum-rich mischmetal") may also be used. The lanthanum-rich mischmetal contains, for example, 10 mass % to 30 mass % of Ce, 40 mass % to 70 mass % of La, and Nd, Pr, Sm, and the like as the remainder. Specific examples include Mm containing 25.8 mass % of Ce, 63.8 mass % of La, 7.9 mass % of Nd, and 2.4 mass % of Pr.

The hydrogen-absorbing alloy may be an $AB_5$ type alloy expressed by Formula (3).

$$MmNi_{5-x3}Fe_{x3} \quad (3)$$

(in the formula, Mm represents the mischmetal, and x3 is 0.2 or more and 0.4 or less.)

As the $AB_5$ type alloy expressed by Formula (3), for example, $MmNi_{4.7}Fe_{0.3}$ or the like can be exemplified.

The hydrogen-absorbing alloy may be an $AB_5$ type alloy expressed by Formula (4).

$$MmNi_{5-x4}Cr_{x4} \quad (4)$$

(in the formula, Mm represents the mischmetal, and x4 is 0.4 or more and 0.6 or less.) As the $AB_5$ type alloy expressed by Formula (4), for example, $MmNi_{4.5}Cr_{0.5}$ or the like can be exemplified.

The hydrogen-absorbing alloy may be an $AB_5$ type alloy expressed by Formula (5).

$$MmNi_{5-x5}Co_{x5} \quad (5)$$

(in the formula, Mm represents the mischmetal, and x5 is 0.7 or more and 0.9 or less.)

As the $AB_5$ type alloy expressed by Formula (5), for example, $MmNi_{4.2}Co_{0.8}$ or the like can be exemplified.

The hydrogen-absorbing alloy may be an $AB_5$ type alloy expressed by Formula (6).

$$MmNi_{5-x6}Mn_{x6} \quad (6)$$

(in the formula, Mm represents the mischmetal, and x6 is 0.4 or more and 0.6 or less.)

As the $AB_5$ type alloy expressed by Formula (6), for example, $MmNi_{4.5}Mn_{0.5}$ or the like can be exemplified.

The hydrogen-absorbing alloy may be an $AB_5$ type alloy expressed by Formula (7).

$$MmNi_{5-x7}Al_{x7} \quad (7)$$

(in the formula, Mm represents the mischmetal, and x7 is 0.4 or more and 0.6 or less.)

As the $AB_5$ type alloy expressed by Formula (7), for example, $MmNi_{4.5}Al_{0.5}$ or the like can be exemplified.

The hydrogen-absorbing alloy may be an $AB_5$ type alloy expressed by Formula (8).

$$MmNi_{5-x8-y8}Cr_{x8}Mn_{y8} \quad (8)$$

(In the formula, Mm represents the mischmetal, x8 is 0.25 or more and 0.45 or less, y8 is 0.05 or more and 0.25 or less, and the sum of x8 and y8 is 0.5.)

Examples of the $AB_5$ type alloy expressed by Formula (8) include $MmNi_{4.5}Cr_{0.45}Mn_{0.05}$ and $MmNi_{4.5}Cr_{0.25}Mn_{0.25}$.

Therefore, the hydrogen-absorbing alloy may be at least one selected from the group consisting of (i) $MmNi_5$, (ii) the $AB_5$ type alloys expressed by Formulas (3) to (8), and (iii) $LaNi_5$.

Alternatively, the hydrogen-absorbing alloy may be at least one selected from the group consisting of $MmNi_5$, $MmNi_{4.7}Fe_{0.3}$, $MmNi_{4.5}Cr_{0.5}$, $MmNi_{4.2}Co_{0.8}$, $MmNi_{4.5}Mn_{0.5}$, $MmNi_{4.5}Al_{0.5}$, $MmNi_{4.5}Cr_{0.45}Mn_{0.05}$, $MmNi_{4.5}Cr_{0.25}Mn_{0.25}$, and $LaNi_5$.

As the hydrogen absorption amount of the hydrogen-absorbing alloy increases, the improvement in the mass capacity density of the battery 100 can be expected. The "hydrogen absorption amount" represents the ratio of the mass of hydrogen to the mass of the alloy in a state where all the alloys are hydrogenated. The high pressure type hydrogen-absorbing alloy can have, for example, a hydrogen absorption amount of 1.3 mass % or more and 1.5 mass % or less. Furthermore, the high pressure type hydrogen-absorbing alloy may also have a hydrogen absorption amount of 1.4 mass % or more and 1.5 mass % or less.

Hydrogen Gas

The pressure vessel 50 is filled with the hydrogen gas. Hydrogen gas has a pressure equal to or higher than the plateau pressure at 25° C. of the high pressure type hydrogen-absorbing alloy. Accordingly, the high pressure type hydrogen-absorbing alloy can function as a high-capacity negative electrode active material. The pressure of the hydrogen gas is measured with a pressure gauge. It is natural that the pressure gauge should be selected as appropriate depending on the pressure of the hydrogen gas, the form of the pressure vessel 50, and the like. For example, a pressure gauge for high pressure hydrogen gas at 70 MPa is also commercially available. The pressure gauge may be permanently installed in the pressure vessel 50.

The hydrogen gas of this embodiment functions as the negative electrode active material, thereby contributing to the improvement in the mass capacity density of the battery 100. The hydrogen gas preferably has a pressure of 10 MPa or more and 70 MPa or less at 25° C. As the hydrogen gas (the negative electrode active material) is compressed, the improvement in the volumetric energy density of the battery 100 is expected. At 25° C., the hydrogen gas has a pressure of more preferably 20 MPa or more and 70 MPa or less, even more preferably 40 MPa or more and 70 MPa or less, and most preferably 60 MPa or more and 70 MPa or less.

Positive Electrode

The positive electrode 10 contains a positive electrode active material. The shape of the positive electrode 10 is also not particularly limited. The positive electrode 10 may also be, for example, a plate-like member. The planar shape of the positive electrode 10 may also be a rectangular shape, a band shape, or the like. The positive electrode active material may be, for example, at least one of NiOOH and $Ni(OH)_2$. That is, the positive electrode 10 may be a nickel positive electrode. The nickel positive electrode may be a sintered nickel positive electrode well known in the related art, or may be a paste type nickel positive electrode. For example, the positive electrode 10 may be formed by filling a base material such as foamed Ni with a positive electrode mixture material containing the positive electrode active material, a conductive material, and a binder. The conductive material may be, for example, cobalt oxide (CoO), or cobalt hydroxide $(Co(OH)_2)$. The binder may be, for example, PVA, CMC, SBR, PTFE, or FEP. The positive electrode mixture material contains, for example, 80 mass % to 98 mass % of the positive electrode active material, 1 mass % to 10 mass % of the conductive material, and 1 mass % to 10 mass % of the binder.

Separator

The separator 30 is disposed between the positive electrode 10 and the negative electrode 20. The separator 30 may be, for example, a nonwoven fabric made of polypropylene (PP), or a nonwoven fabric made of polyamide (PA). The nonwoven fabric may be subjected to a treatment for imparting hydrophilicity to the surface of the fiber. Examples of the treatment for imparting hydrophilicity include a sulfonation treatment and a plasma treatment. The nonwoven fabric has, for example, a thickness of about 50 μm to 500 μm. The nonwoven fabric has, for example, a basis weight of about 50 $g/m^2$ to 100 $g/m^2$.

Electrolyte

Voids in the positive electrode 10, the negative electrode 20, and the separator 30 are impregnated with the electrolyte. The electrolyte may be, for example, a potassium hydroxide (KOH) aqueous solution. The electrolyte may contain, in addition to KOH, sodium hydroxide (NaOH), lithium hydroxide (LiOH), and the like. The concentration of hydroxide ions ($OH^-$) in the electrolyte may be, for example, about 1 mol/l to 20 mol/l.

In a nickel-metal hydride secondary battery in the related art, water contained in the electrolyte may be electrolyzed during charging, and hydrogen gas may be generated. In the high pressure type hydride secondary battery of this embodiment, the inside of the pressure vessel 50 is filled with the high pressure hydrogen gas. Therefore, it is expected that electrolysis of water will hardly proceed due to Le Chatelier's principle.

Hereinafter, examples will be described. However, the following examples do not limit the scope of this disclosure.

Preparation of Hydrogen-Absorbing Alloy

Various hydrogen-absorbing alloys were prepared in the following manner.

Sample No. 1

A Mm powder and a Ni powder were prepared. The Mm powder and the Ni powder were mixed in a molar ratio of "Mm:Ni=1:5". Accordingly, a mixed powder was prepared. The mixed powder was dissolved in an arc melting furnace under an argon atmosphere. Accordingly, a molten alloy was prepared. The molten alloy was cooled by a strip casting method. Accordingly, a cast piece of a hydrogen-absorbing alloy ($MmNi_5$) was obtained. The case piece was crushed by a ball mill. Accordingly, a powder of the hydrogen-absorbing alloy ($AB_5$ type alloy) was prepared. The powder had a particle size of 20 μm to 100 μm.

Sample Nos. 2 to 13

As shown in Table 1 below, powders of hydrogen-absorbing alloys according to Sample Nos. 2 to 13 were prepared in the same procedure as Sample No. 1 except that the alloy composition was changed.

TABLE 1

Sample list

| Sample No. | Alloy composition | Hydrogen-absorbing alloy | | | | Test cell | |
|---|---|---|---|---|---|---|---|
| | | Plateau pressure (25° C.) [MPa] | Hydrogen absorption amount [mass %] | ΔH [kJ/mol $H_2$] | ΔS [J/K · mol $H_2$] | Mass capacity density [mAh/g] | Voltage [V] |
| 1 | $MmNi_5$ | 2.3 | 1.5 | −21.1 | −97 | 400 | 1.26 |
| 2 | $MmNi_{4.7}Fe_{0.3}$ | 1.6 | 1.4 | −22 | −97 | 370 | 1.25 |
| 3 | $MmNi_{4.5}Cr_{0.5}$ | 0.57 | 1.3 | −25.5 | −100 | 340 | 1.24 |
| 4 | $MmNi_{4.2}Co_{0.8}$ | 2.1 | 1.5 | −23.8 | −105 | 400 | 1.26 |
| 5 | $MmNi_{4.5}Mn_{0.5}$ | 0.33 | 1.5 | −28 | −104 | 400 | 1.23 |
| 6 | $MmNi_{4.5}Al_{0.5}$ | 0.38 | 1.3 | −28 | −105 | 340 | 1.24 |
| 7 | $MmNi_{4.5}Cr_{0.45}Mn_{0.05}$ | 0.30 | 1.5 | −30 | −104 | 400 | 1.23 |
| 8 | $MmNi_{4.5}Cr_{0.25}Mn_{0.25}$ | 0.20 | 1.5 | −30 | −105 | 390 | 1.22 |
| 9 | $LaNi_5$ | 0.15 | 1.4 | −31 | −108 | 370 | 1.22 |
| 10 | $MmNi_{4.2}Cr_{0.2}Mn_{0.5}Al_{0.3}$ | 0.02 | 1.1 | −37 | −109 | 300 | 1.20 |
| 11 | $MmNi_{4.0}Fe_{1.0}$ | 0.10 | 1.0 | −29 | −99 | 270 | 1.22 |
| 12 | $MmNi_{4.2}Mn_{0.8}$ | 0.10 | 1.0 | −28 | −95 | 270 | 1.22 |
| 13 | $MmNi_{4.1}Al_{0.9}$ | 0.10 | 1.0 | −33 | −105 | 260 | 1.22 |

Production of Test Cell

A test cell (hydride secondary battery) including a test electrode containing a powder of a hydrogen-absorbing alloy and a test electrode was produced according to the procedure based on "JIS H 7205". Here, as the container for the test cell, a pressure vessel capable of withstanding the same pressure as the plateau pressure of the hydrogen-absorbing alloy was used, and the pressure vessel was filled with hydrogen gas so that the internal pressure of the pressure vessel was equal to or higher than the plateau pressure. Other configurations of the test cell are as follows.

Test Cell

Counter electrode: nickel hydroxide
Electrolyte: KOH aqueous solution (6 mol/l)
Separator: nonwoven fabric made of PP Evaluation By the method described above, desorption curves at 25° C. were measured. Furthermore, a PCT diagram was created. For the measurement, a Sieverts' instrument manufactured by Suzuki Shokan Co., Ltd. was used. Plateau pressures, hydrogen absorption amounts, ΔH, and ΔS were calculated. The results are shown in Table 1 above.

As shown in Table 1 above, Sample Nos. 1 to 9 were the high pressure type hydrogen-absorbing alloys having a plateau pressure of 0.15 MPa or more and 10 MPa or less. Sample Nos. 10 to 13 were low pressure type hydrogen-absorbing alloys having a plateau pressure of less than 0.15 MPa.

The discharge characteristics and voltages of the test cells were measured by the procedure based on "JIS H 7205". Accordingly, the mass capacity density of the hydrogen-absorbing alloy was obtained. The results are shown in Table 1 above.

As shown in Table 1 above, the test cells (that is, the high pressure type hydride secondary batteries) including the high pressure type hydrogen-absorbing alloys (Sample Nos. 1 to 9) had a higher mass capacity density than the test cells including the low pressure type hydrogen-absorbing alloys (Sample Nos. 10 to 13).

The embodiments and examples disclosed herein are examples in all respects and should not be considered restrictive. The scope of the disclosure of this disclosure should be indicated not by the embodiments and examples described above but by the claims. The scope of this disclosure is intended to include meanings equivalent to claims and all changes within the scope.

What is claimed is:

1. A hydride secondary battery comprising:
   a pressure vessel;
   a positive electrode disposed in the pressure vessel;
   a negative electrode disposed in the pressure vessel; and
   hydrogen gas with which the pressure vessel is filled,
   wherein the negative electrode contains a hydrogen-absorbing alloy, and in a pressure-composition-temperature diagram, a desorption curve at 25° C. of the hydrogen-absorbing alloy has a plateau pressure of between 0.15 MPa or more and 10 MPa or less,
   wherein the hydrogen-absorbing alloy is an $AB_5$ type alloy expressed by $MmNi_{5-x8-y8}Cr_{x8}Mn_{y8}$, provided that Mm represents a mischmetal, x8 is between 0.25 or more and 0.45 or less, y8 is between 0.05 or more and 0.25 or less, and a sum of x8 and y8 is 0.5, and
   wherein the hydrogen gas has a pressure equal to or higher than the plateau pressure at 25° C. of the hydrogen-absorbing alloy, and
   wherein the mischmetal is an alloy comprising Ce and La.

2. The hydride secondary battery according to claim 1, wherein the desorption curve at 25° C. of the hydrogen-absorbing alloy has a plateau pressure of between 0.15 MPa or more and 5 MPa or less.

3. The hydride secondary battery according to claim 1, wherein the desorption curve at 25° C. of the hydrogen-absorbing alloy has a plateau pressure of between 0.3 MPa or more and 2.3 MPa or less.

4. The hydride secondary battery according to claim 1, wherein the hydrogen-absorbing alloy is at least one selected from the group consisting of $MmNi_{4.5}Cr_{0.45}Mn_{0.05}$, and $MmNi_{4.5}Cr_{0.25}Mn_{0.25}$, provided that Mm represents a mischmetal.

5. The hydride secondary battery according to claim 1, wherein the hydrogen-absorbing alloy has a hydrogen absorption amount of between 1.3 mass % or more and 1.5 mass % or less.

6. The hydride secondary battery according to claim 1, wherein the hydrogen gas has a pressure at 25° C. of between 10 MPa or more and 70 MPa or less.

7. The hydride secondary battery according to claim 1, wherein the positive electrode contains at least one of nickel oxyhydroxide and nickel hydroxide.

\* \* \* \* \*